United States Patent [19]

Mitsuyasu et al.

[11] 4,412,520

[45] Nov. 1, 1983

[54] FUEL INJECTION CONTROL APPARATUS

[75] Inventors: Masaki Mitsuyasu; Keiji Aoki; Takayoshi Nakatomi, all of Susono, Japan

[73] Assignee: Toyota Jidosha Kogyo Kabushiki Kaisha, Toyota, Japan

[21] Appl. No.: 287,806

[22] Filed: Jul. 28, 1981

[30] Foreign Application Priority Data

Jul. 30, 1980 [JP] Japan .......................... 55-106872[U]

[51] Int. Cl.³ .......................... F02B 3/00; F02M 7/00
[52] U.S. Cl. ...................................... 123/488; 73/118
[58] Field of Search .................... 73/115, 118 A, 707, 73/753; 123/480, 488, 494

[56] References Cited

U.S. PATENT DOCUMENTS

| 4,010,717 | 3/1977 | Taplin | 123/488 X |
| 4,212,065 | 7/1980 | Marchak et al. | 123/488 |

Primary Examiner—E. R. Kazenske
Assistant Examiner—J. Chapman
Attorney, Agent, or Firm—Cushman, Darby & Cushman

[57] ABSTRACT

A fuel injection control apparatus having a pressure detection device for detecting pneumatic pressure in an intake manifold of an internal combustion engine comprises a pressure transducer and a low-pass filter, electrically connected to the transducer, for transmitting an electrical signal from the transducer below a cutoff frequency which is determined to be a frequency equal to or lower than 40 Hz.

4 Claims, 4 Drawing Figures

_FUEL INJECTION CONTROL APPARATUS_

BACKGROUND OF THE INVENTION

The present invention relates to a pressure detection device for detecting pneumatic pressure in an intake manifold of an internal combustion engine.

In engine control systems for controlling the combustion of a fuel, by using a digital computer, in accordance with the pneumatic pressure in the intake manifold (hereinafter referred to as the intake manifold pressure) and with other engine parameters indicative of the condition of the engine, a pressure detection device must be provided for generating an electrical signal which corresponds to the intake manifold pressure. As an example, such a device is desirable in fuel injection control systems for controlling the amount of fuel to be injected into the engine in accordance with the intake manifold pressure and with the rotational speed of the engine.

A conventional pressure detection device is composed of only a pressure transducer for converting the intake manifold pressure to an electrical signal, and thus the converted electrical signal directly appears as a detected intake manifold pressure signal. The digital computer takes samples of the output signal from the pressure detection device at predetermined intervals of time, and then calculates, for example, the amount of fuel to be injected into the engine, in accordance with the samples taken.

However, according to the conventional pressure detection device, since the output signal from the pressure detection device changes in response to the pulsation of the intake manifold pressure, which pressure pulsation is caused by the intake stroke action and the compression stroke action of the engine, the samples of the signals taken differ from each other in value in accordance with the time when the samples are taken. Therefore, errors in the calculated amount of fuel to be injected into the engine occur. In particular, in a high rotational speed region, since the pulsation frequency of the intake manifold pressure becomes higher, the above error increases.

SUMMARY OF THE INVENTION

It is, therefore, an object of the present invention to provide a pressure detection device, whereby an output signal which does not change in response to the pulsation of the intake manifold pressure, even when the engine rotates at a high speed, can be obtained.

According to the present invention, a pressure detection device comprises a pressure transducer for converting pneumatic pressure in the intake manifold to an electrical signal, and a low-pass filter electrically connected to the transducer in series for transmitting the electrical signal below a cutoff frequency which is determined to be a frequency lower than or equal to 40 Hz.

The above and other related objects and features of the present invention will be apparent from the description of the present invention set forth below, with reference to the accompanying drawings, as well as from the appended claims.

DETAILED DESCRIPTION OF THE PREFERRED EMBODIMENTS

Figure 1:
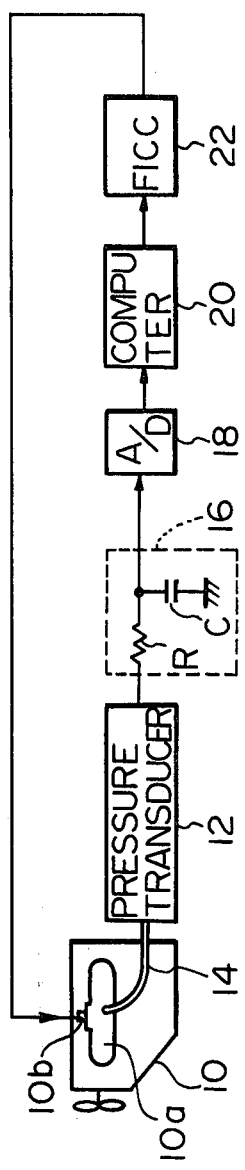
FIG. 1 is a block diagram illustrating an embodiment of the present invention.

FIG. 1 schematically illustrates an electronic fuel injection control system for controlling the amount of fuel to be injected into an internal combustion engine, in accordance with the intake manifold pressure. In FIG. 1, reference numeral 10 denotes the engine, and 12 denotes a pressure transducer. The pressure transducer 12 detects pneumatic pressure in an intake manifold 10a via a conduit 14 and generates an electrical signal indicative of the detected intake manifold pressure. Well-known pneumatic pressure transducers made from, for example, pressure sensitive semi-conductors are used as the pressure transducer 12. The electrical signal generated by the transducer 12 is applied to a low-pass filter to eliminate a pulsating component corresponding to the pulsation of the intake manifold pressure, which pulsation accompanies the intake stroke action and the compression stroke action of the engine. According to the present invention, the pressure transducer 12 and the low-pass filter 16 connected to the output of the transducer 12 in series constitute a pressure detection device.

Figure 2:
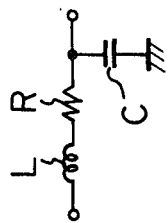
FIG. 2 illustrates another example of the low pass filter shown in FIG. 1.

The low-pass filter 16 illustrated in FIG. 1 is composed of a resistance-capacitance (RC) low-pass filter. However, the low-pass filter 16 may be composed of an inductance-resistance-capacitance (LRC) low-pass filter, as illustrated in FIG. 2. As is well-known, although the LRC low-pass filter has excellent frequency cutoff characteristics in comparison with that of the RC low-pass filter, the cost of the LRC low-pass filter is higher than that of the RC low-pass filter. The cutoff frequency of the low-pass filter 16 is selected to be a frequency lower than or equal to 40 Hz. For example, if the time constant of the RC low-pass filter 16 is chosen to be 10 msec, the cutoff frequency thereof is determined to be 16 Hz.

The output signal from the low-pass filter 16 is applied to an analog to digital converter 18. At the converter 18, the output signal is sampled at predetermined periods of time, for example, every 4 msec. The sample is converted to an intake manifold pressure signal in the form of a binary number, and then applied to a digital computer 20. The digital computer 20 repetitively calculates fuel-injection pulse-width as a function of the intake manifold pressure and the rotational speed which is applied to the computer 20 from a sensor (not illustrated). The calculated pulse-width value is fed to a fuel injection control circuit 22 which is constituted by a fuel injection duration timer and a power driver circuit. An output current from the circuit 22, having a duration corresponding to the calculated pulse-width is fed to at least one fuel injector 10b and drives it so as to discharge the calculated amount of fuel into the intake manifold. Such a fuel injection system, except for the pressure detection device, is described in U.S. Pat. No. 3,969,614 and is well-known. If the pressure detection device according to the present invention is employed in such a fuel injection control system, since the pulsating component corresponding to the pulsation of the intake manifold pressure can be eliminated from the detected intake manifold pressure signal, the accuracy of the fuel-injection control can be extremely improved.

Figure 3:
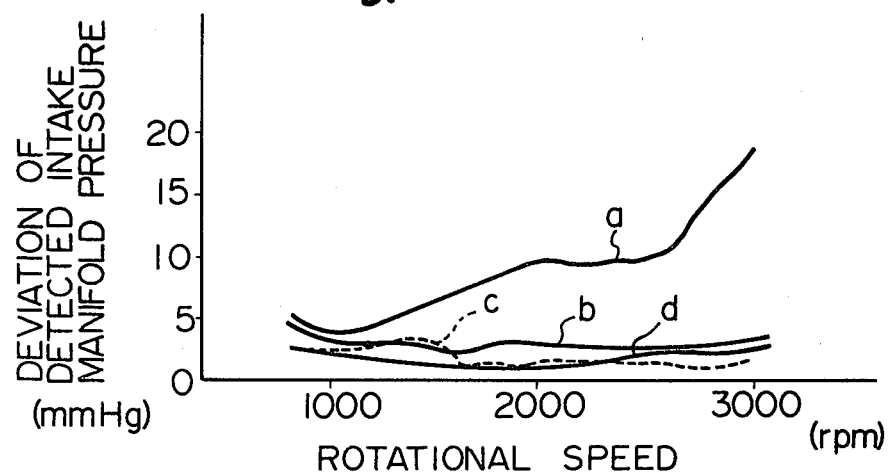
FIG. 3 illustrates deviations of the detected intake manifold pressure characteristics according to various pressure detection devices, with respect to the rotational speed.

FIG. 3 illustrates detection characteristics of the pressure detection device according to the present invention and to the prior art. In FIG. 3, the abscissa represents the rotational speed of the engine, and the ordinate represents the deviation of the pressure values indicated by the detected intake manifold pressure signals, which are obtained by sampling the detected outputs from the pressure detection devices and by analog-to-digital-conversion of the sample using the analog to digital converter. Reference symbol a in FIG. 3 indicates characteristics of the detected intake manifold pressure signal according to a prior art pressure detection device having no low-pass filter. Reference symbols b, c and d indicate characteristics of detected intake manifold pressure signals from respective pressure detection devices according to the present invention. The device corresponding to the characteristics of b employs an RC low-pass filter having a cutoff frequency of 16 Hz (where R=1 KΩ, C=10 μF). The device corresponding to c employs an RC low-pass filter having a cutoff frequency of 5 Hz (where R=1 KΩ, C=30 μF). The device corresponding to d employs an LRC low-pass filter (where L=5.0 H, R=200 Ω, C=100 μF). These characteristics of FIG. 3 were measured under the condition where the intake manifold pressure of the four-cycle four-cylinder engine is maintained at 700 mmHg (absolute pressure).

As apparent from FIG. 3, the pressure detection devices having the above-mentioned low-pass filters can restrain the change in the detected manifold pressure within 5 mmHg over the whole rotational speed range of the engine.

In order to restrain the change in the detected manifold pressure within 5 mmHg irrespctive of the pulsation of the manifold pressure, it is necessary that the cutoff frequency of the low-pass filter is chosen to be equal to or below 40 Hz. Hereinafter, the reason of this will be explained.

As illustrated by the characteristics of a in FIG. 3, the detected intake manifold pressure without the low-pass filter has a deviation of 10 mmHg at the rotational speed of 2000 rpm. Therefore, if the deviation at the rotational speed of 2000 rpm is restrained within 5 mmHg by a low-pass filter, it is assumed that the deviation will decrease to be equal to or lower than 5 mmHg over the whole rotational speed range. In order to accomplish this restraint, the gain $V_{out}/V_{in}$ of the low-pass filter 16 should be determined to be ½ at the frequency corresponding to the rotational speed of 2000 rpm. The gain $V_{out}/V_{in}$ of the RC low-pass filter 16 of FIG. 1 is represented as, $$\frac{|V_{out}|}{|V_{in}|} = \frac{\frac{1}{\omega c}|V_{in}|}{\sqrt{R^2 + \left(\frac{1}{\omega c}\right)^2}} = \frac{1}{\sqrt{1 + (\omega CR)^2}}$$

therefore, $$\frac{1}{\sqrt{1 + (\omega CR)^2}} = \frac{1}{2}$$

$$1 + (\omega CR)^2 = 4$$

The pulsating frequency fp of the intake manifold pressure when the four-cycle four-cylinder engine rotates at 2000 rpm is given as fp ≈ 67 (Hz). Therefore ω will be $$\omega = 2\pi fp \approx 2\pi \times 67$$

thus, $$CR \approx 4.1 \times 10^{-3} \text{ (sec)}$$

As is well-known, the cutoff frequency fc of the RC low-pass filter having the time constant (CR) of about 4 msec is 40 Hz. Accordingly, if the cutoff frequency of the low-pass filter is selected to be equal to or lower than 40 Hz, the change in the detected intake manifold pressure can be maintained within 5 mmHg.

On the other hand, it is desired that the cutoff frequency of the low-pass filter is determined to be a frequency equal to or higher than 0.4 Hz. This is because if the detection delay of the operation condition of the engine in a normal state exceeds 0.4 sec, the driver feels a very poor response with respect to the operation of the engine. It is apparent that the time delay of 0.4 sec is caused by the low-pass filter having a cutoff frequency of 0.4 Hz.

Figure 4:
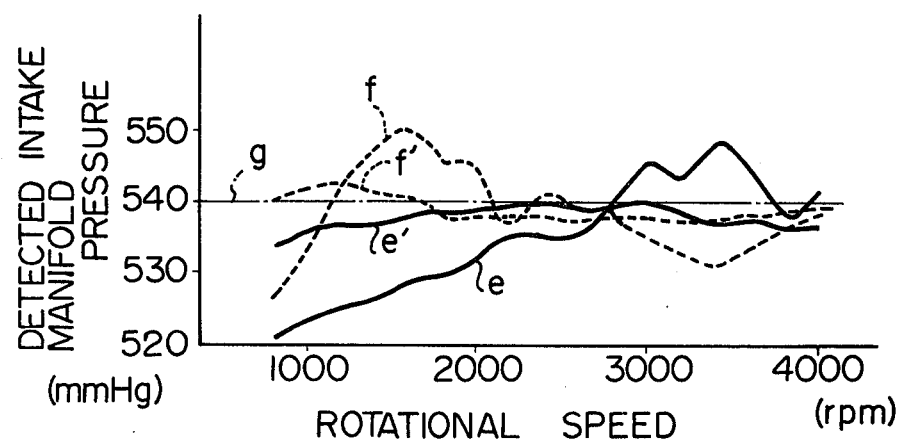
FIG. 4 illustrates the detected intake manifold pressure characteristics according to various pressure detection devices, with respect to the rotational speed.

According to the pressure detection device of the present invention, the following additional effect can be obtained. Namely, the detected intake manifold pressure can be prevented from greatly changing when the length of the conduit 14 from the intake manifold 10a to the pressure transducer 12 is varied. FIG. 4 illustrates detected intake manifold pressure characteristics at different conduit lengths. In FIG. 4, the abscissa represents the rotational speed, and the ordinate represents the detected intake manifold pressure. The detected pressure characteristics according to the pressure detection device without a low-pass filter are extremely different from each other in accordance with the length of the conduit 14. In FIG. 4, the solid line of e corresponds to the conduit length of 0.3 m, and the broken line of f corresponds to the conduit length of 1.9 m. However, in the case of the pressure detection device with the low-pass filter having a cutoff frequency of 16 Hz, the detected pressures are maintained within a range near a set value g, irrespective of the change in the conduit length and also in the rotational speed. In FIG. 4, the solid line of e' corresponds to the conduit length of 0.3 m, and the broken line of f' corresponds to the conduit length of 1.9 m.

As will be apparent from the foregoing explanation, according to the present invention, the detected intake manifold pressure can be prevented from changing in response to the pulsation of the actual intake manifold pressure even when the engine rotates at a high speed, and furthermore, the detected intake manifold pressure can remove the influence caused by a difference in the length of the conduit between the intake manifold and the pressure transducer.

As many widely different embodiments of the present invention may be constructed without departing from the spirit and scope of the present invention, it should be understood that the present invention is not limited to the specific embodiments described in this specification, except as defined in the appended claims.

We claim:

1. Fuel injection control apparatus for an internal combustion engine having an intake manifold, comprising:
   a pressure transducer for converting the pneumatic pressure in the intake manifold to an electrical signal;
   a low-pass filter electrically connected to said pressure transducer in series for transmitting said electrical signal below a cutoff frequency which is determined to be a frequency equal to or lower than 40 Hz;
   an analog to digital converter means connected to said low-pass filter in series for converting the output signal from the low-pass filter to a binary number signal;
   means for calculating the pulse width of fuel injection signals in response to said binary number signal from said analog to digital converter means, said pulse width corresponding to the fuel requirements of the engine during steady state and transient operating condition; and
   means for adjusting the amount of fuel injected into the engine in response to said fuel injection signals.

2. Apparatus as claimed in claim 1, wherein the cutoff frequency of said low-pass filter is determined to be a frequency equal to or lower than 40 Hz and equal to or higher than 0.4 Hz.

3. Apparatus as claimed in claim 1 or 2, wherein said low-pass filter is composed of a resistance-capacitance filter.

4. Apparatus as claimed in claim 1 or 2, wherein said low-pass filter is composed of an inductance-resistance-capacitance filter.

* * * * *